US012175708B2

United States Patent
Guizilini et al.

(10) Patent No.: US 12,175,708 B2
(45) Date of Patent: Dec. 24, 2024

(54) SYSTEMS AND METHODS FOR SELF-SUPERVISED LEARNING OF CAMERA INTRINSIC PARAMETERS FROM A SEQUENCE OF IMAGES

(71) Applicant: Toyota Research Institute, Inc., Los Altos, CA (US)

(72) Inventors: Vitor Guizilini, Santa Clara, CA (US); Adrien David Gaidon, Mountain View, CA (US); Rares A. Ambrus, San Francisco, CA (US); Igor Vasiljevic, Fort Lauderdale, FL (US); Jiading Fang, Chicago, IL (US); Gregory Shakhnarovich, Chicago, IL (US); Matthew R. Walter, Chicago, IL (US)

(73) Assignees: Toyota Research Institute, Inc., Los Altos, CA (US); Toyota Technological Institute at Chicago, Chicago, IL (US)

( * ) Notice: Subject to any disclaimer, the term of this patent is extended or adjusted under 35 U.S.C. 154(b) by 265 days.

(21) Appl. No.: 17/692,357

(22) Filed: Mar. 11, 2022

(65) Prior Publication Data
US 2023/0080638 A1    Mar. 16, 2023

Related U.S. Application Data

(60) Provisional application No. 63/243,463, filed on Sep. 13, 2021.

(51) Int. Cl.
*G06T 3/18* (2024.01)
*G06T 5/80* (2024.01)
(Continued)

(52) U.S. Cl.
CPC ............. *G06T 7/80* (2017.01); *G06T 3/18* (2024.01); *G06T 5/80* (2024.01); *G06T 7/50* (2017.01);
(Continued)

(58) Field of Classification Search
CPC ..... G06T 7/80; G06T 3/18; G06T 5/80; G06T 7/50; G06T 2207/10016;
(Continued)

(56) References Cited

U.S. PATENT DOCUMENTS

2017/0078551 A1\*  3/2017  Kweon ................. H04N 23/71
2020/0167941 A1\*  5/2020  Tong ..................... G06F 18/251
(Continued)

OTHER PUBLICATIONS

"Fixing Defect of Photometric Loss for Self-Supervised Monocular Depth Estimation" by Chen at al. (published on Mar. 24, 2021) https://ieeexplore.ieee.org/document/9386100 (Year: 2021).\*
(Continued)

*Primary Examiner* — Rinna Yi
(74) *Attorney, Agent, or Firm* — Christopher G. Darrow; Darrow Mustafa PC

(57) ABSTRACT

Systems and methods described herein relate to self-supervised learning of camera intrinsic parameters from a sequence of images. One embodiment produces a depth map from a current image frame captured by a camera; generates a point cloud from the depth map using a differentiable unprojection operation; produces a camera pose estimate from the current image frame and a context image frame; produces a warped point cloud based on the camera pose estimate; generates a warped image frame from the warped point cloud using a differentiable projection operation; compares the warped image frame with the context image frame to produce a self-supervised photometric loss; updates a set of estimated camera intrinsic parameters on a per-image-sequence basis using one or more gradients from the self-supervised photometric loss; and generates, based on a converged set of learned camera intrinsic parameters, a rectified image frame from an image frame captured by the camera.

20 Claims, 6 Drawing Sheets

(51) Int. Cl.
| | |
|---|---|
| *G06T 7/50* | (2017.01) |
| *G06T 7/80* | (2017.01) |
| *B60W 60/00* | (2020.01) |
| *B64C 39/02* | (2023.01) |
| *G05D 1/00* | (2006.01) |
| *H04N 17/00* | (2006.01) |

(52) U.S. Cl.
CPC ..... *B60W 60/001* (2020.02); *B60W 2420/403* (2013.01); *B64C 39/024* (2013.01); *B64U 2201/00* (2023.01); *G05D 1/0246* (2013.01); *G06T 2207/10016* (2013.01); *G06T 2207/10028* (2013.01); *G06T 2207/10032* (2013.01); *G06T 2207/20081* (2013.01); *G06T 2207/20084* (2013.01); *G06T 2207/30244* (2013.01); *G06T 2207/30252* (2013.01); *H04N 17/002* (2013.01)

(58) Field of Classification Search
CPC ........... G06T 2207/10028; G06T 2207/10032; G06T 2207/20081; G06T 2207/20084; G06T 2207/30244; G06T 2207/30252; H04N 17/002; H04N 13/221; H04N 13/246; H04N 5/2628; B60W 60/001; B60W 2420/403; B64C 39/024; B64U 2201/00

See application file for complete search history.

(56) References Cited

U.S. PATENT DOCUMENTS

| | | | | |
|---|---|---|---|---|
| 2020/0382700 | A1* | 12/2020 | Takatsu | G06T 5/92 |
| 2021/0124985 | A1* | 4/2021 | Ren | G06V 30/248 |
| 2022/0066544 | A1* | 3/2022 | Kwon | G06V 40/23 |
| 2022/0277514 | A1* | 9/2022 | Yin | G06T 7/529 |

OTHER PUBLICATIONS

"Unsupervised Learning of Depth and Ego-Motion from Video" by Zhou et al. (published on Nov. 7, 2017) https://ieeexplore.ieee.org/document/8100183 (Year: 2017).*

"Real-Time Photometric Calibrated Monocular Direct Visual SLAM" by Liu et al. (published on Aug. 19, 2019) https://www.mdpi.com/1424-8220/19/16/3604 (Year: 2019).*

Z. Zhang, "A flexible new technique for camera calibration," IEEE Transactions on Pattern Analysis and Machine Intelligence, vol. 22, No. 11, pp. 1330-1334, 2000.

D. Scaramuzza, A. Martinelli, and R. Siegwart, "A flexible technique for accurate omnidirectional camera calibration and structure from motion," in Proceedings of the IEEE International Conference on Computer Vision Systems (ICVS), 2006, pp. 45-45.

J. Kannala and S. S. Brandt, "A generic camera model and calibration method for conventional, wide-angle, and fish-eye lenses," IEEE Transactions on Pattern Analysis and Machine Intelligence, vol. 28, No. 8, pp. 1335-1340, 2006.

M. D. Grossberg and S. K. Nayar, "A general imaging model and a method for finding its parameters," in Proceedings of the International Conference on Computer Vision (ICCV), vol. 2, 2001, pp. 108-115.

B. Caprile and V. Torre, "Using vanishing points for camera calibration," International Journal on Computer Vision, vol. 4, No. 2, pp. 127-139, 1990.

M. Pollefeys and L. Van Gool, "A stratified approach to metric self-calibration," in Proceedings of the IEEE Conference on Computer Vision and Pattern Recognition (CVPR), 1997, pp. 407-412.

R. Cipolla, T. Drummond, and D. P. Robertson, "Camera calibration from vanishing points in image of architectural scenes," in Proceedings of the British Machine Vision Conference (BMVC), 1999, pp. 382-391.

O. Bogdan, V. Eckstein, F. Rameau, and J.-C. Bazin, "Deep-Calib: A deep learning approach for automatic intrinsic calibration of wide field-of-view cameras," in Proceedings of the ACM SIGGRAPH European Conference on Visual Media Production, 2018.

R. Garg, V. K. Bg, G. Carneiro, and I. Reid, "Unsupervised CNN for single view depth estimation: Geometry to the rescue," in Proceedings of the European Conference on Computer Vision (ECCV), 2016, pp. 740-756.

T. Zhou, M. Brown, N. Snavely, and D. G. Lowe, "Unsupervised learning of depth and ego-motion from video," in Proceedings of the IEEE Conference on Computer Vision and Pattern Recognition (CVPR), 2017, pp. 1851-1858.

A. Gordon, H. Li, R. Jonschkowski, and A. Angelova, "Depth from videos in the wild: Unsupervised monocular depth learning from unknown cameras," in Proceedings of the International Conference on Computer Vision (ICCV), 2019, pp. 8977-8986.

I. Vasiljevic, V. Guizilini, R. Ambrus, S. Pillai, W. Burgard, G. Shakhnarovich, and A. Gaidon, "Neural ray surfaces for self-supervised learning of depth and ego-motion," in Proceedings of the International Conference on 3D Vision (3DV), 2020.

V. Usenko, N. Demmel, and D. Cremers, "The double sphere camera model," in Proceedings of the International Conference on 3D Vision (3DV), 2018, pp. 552-560.

R. Hartley and A. Zisserman, "Multiple view geometry in computer vision," 2000.

G. Bradski and A. Kaehler, "OpenCV," Dr. Dobb's Journal of Software Tools, vol. 3, 2000.

J. Rehder, J. Nikolic, T. Schneider, T. Hinzmann, and R. Siegwart, "Extending kalibr: Calibrating the extrinsics of multiple IMUs and of individual axes," in Proceedings of the IEEE International Conference on Robotics and Automation (ICRA), 2016, pp. 4304-4311.

J. Leonard et al. "A perception-driven autonomous urban vehicle," Journal of Field Robotics, vol. 25, No. 10, pp. 727-774, Oct. 2008.

C. Urmson, J. Anhalt, D. Bagnell, C. Baker, R. Bittner, M. Clark, J. Dolan, D. Duggins, T. Galatali, C. Geyer et al., "Autonomous driving in urban environments: Boss and the Urban Challenge," Journal of Field Robotics, vol. 25, No. 8, pp. 425-466, 2008.

J. G. Fryer and D. C. Brown, "Lens distortion for close-range photogrammetry," Photogrammetric Engineering and Remote Sensing, vol. 52, pp. 51-58, 1986.

C. Geyer and K. Daniilidis, "A unifying theory for central panoramic systems and practical implications," in Proceedings of the European Conference on Computer Vision (ECCV), 2000, pp. 445-461.

B. Khomutenko, G. Garcia, and P. Martinet, "An enhanced unified camera model," IEEE Robotics and Automation Letters, vol. 1, No. 1, pp. 137-144, 2015.

S. Workman, C. Greenwell, M. Zhai, R. Baltenberger, and N. Jacobs, "DeepFocal: A method for direct focal length estimation," in Proceedings of the IEEE International Conference on Image Processing (ICIP), 2015, pp. 1369-1373.

S. Workman, M. Zhai, and N. Jacobs, "Horizon lines in the wild," arXiv preprint arXiv:1604.02129, 2016.

J. Rong, S. Huang, Z. Shang, and X. Ying, "Radial lens distortion correction using convolutional neural networks trained with synthesized images," in Proceedings of the Asian Conference on Computer Vision, 2016, pp. 35-49.

X. Yin, X. Wang, J. Yu, M. Zhang, P. Fua, and D. Tao, "FishEyeRectNet: A multi-context collaborative deep network for fisheye image rectification," in Proceedings of the European Conference on Computer Vision (ECCV), 2018, pp. 469-484.

M. Lopez-Antequera, R. Mari, P. Gargallo, Y. Kuang, J. Gonzalez-Jimenez, and G. Haro, "Deep single image camera calibration with radial distortion," in Proceedings of the IEEE Conference on Computer Vision and Pattern Recognition (CVPR), 2019, pp. 11 817-11 825.

Y. Hold-Geoffroy, K. Sunkavalli, J. Eisenmann, M. Fisher, E. Gambaretto, S. Hadap, and J.-F. Lalonde, "A perceptual measure for deep single image camera calibration," in Proceedings of the IEEE Conference on Computer Vision and Pattern Recognition (CVPR), 2018.

(56) References Cited

OTHER PUBLICATIONS

R. Zhu, X. Yang, Y. Hold-Geoffroy, F. Perazzi, J. Eisenmann, K. Sunkavalli, and M. Chandraker, "Single view metrology in the wild," in Proceedings of the European Conference on Computer Vision (ECCV), 2020, pp. 316-333.

C. Zhang, F. Rameau, J. Kim, D. M. Argaw, J.-C. Bazin, and I. S. Kweon, "DeepPTZ: Deep self-calibration for PTZ cameras," in Proceedings of the IEEE/CVF Winter Conference on Applications of Computer Vision, 2020, pp. 1041-1049.

Y. Zhao, Z. Huang, T. Li, W. Chen, C. LeGendre, X. Ren, A. Shapiro, and H. Li, "Learning perspective undistortion of portraits," in Proceedings of the International Conference on Computer Vision (ICCV), 2019, pp. 7849-7859.

W. Yin, J. Zhang, O. Wang, S. Niklaus, L. Mai, S. Chen, and C. Shen, "Learning to recover 3D scene shape from a single image," in Proceedings of the IEEE Conference on Computer Vision and Pattern Recognition (CVPR), 2021, pp. 204-213.

S. Yang, C. Lin, K. Liao, C. Zhang, and Y. Zhao, "Progressively complementary network for fisheye image rectification using appearance flow," in Proceedings of the IEEE Conference on Computer Vision and Pattern Recognition (CVPR), 2021, pp. 6348-6357.

K. Liao, C. Lin, and Y. Zhao, "A deep ordinal distortion estimation approach for distortion rectification," IEEE Transactions on Image Processing, vol. 30, pp. 3362-3375, 2021.

C. Godard, O. Mac Aodha, M. Firman, and G. J. Brostow, "Digging into self-supervised monocular depth estimation," in Proceedings of the International Conference on Computer Vision (ICCV), 2019, pp. 3828-3838.

V. Guizilini, R. Ambrus, S. Pillai, A. Raventos, and A. Gaidon, "3D packing for self-supervised monocular depth estimation," in Proceedings of the IEEE Conference on Computer Vision and Pattern Recognition (CVPR), 2020.

S. Pillai, R. Ambrus, and A. Gaidon, "SuperDepth: Selfsupervised, super-resolved monocular depth estimation," in Proceedings of the IEEE International Conference on Robotics and Automation (ICRA), May 2019.

A. Geiger, P. Lenz, and R. Urtasun, "Are we ready for autonomous driving? The KITTI vision benchmark suite," in Proceedings of the IEEE Conference on Computer Vision and Pattern Recognition (CVPR), 2012, pp. 3354-3361.

H. Caesar, V. Bankiti, A. H. Lang, S. Vora, V. E. Liong, Q. Xu, A. Krishnan, Y. Pan, G. Baldan, and O. Beijbom, "nuScenes: A multimodal dataset for autonomous driving," in Proceedings of the IEEE Conference on Computer Vision and Pattern Recognition (CVPR), 2020, pp. 11 621-11 631.

M. Burri, J. Nikolic, P. Gohl, T. Schneider, J. Rehder, S. Omari, M. W. Achtelik, and R. Siegwart, "The EuRoC micro aerial vehicle datasets," International Journal of Robotics Research, vol. 35, No. 10, pp. 1157-1163, 2016.

D. Eigen, C. Puhrsch, and R. Fergus, "Depth map prediction from a single image using a multi-scale deep network," arXiv preprint arXiv:1406.2283, 2014.

M. Schonbein, T. Strauß, and A. Geiger, "Calibrating and centering quasi-central catadioptric cameras," in Proceedings of the IEEE International Conference on Robotics and Automation (ICRA), 2014, pp. 4443-4450.

A. Paszke, S. Gross, S. Chintala, G. Chanan, E. Yang, Z. DeVito, Z. Lin, A. Desmaison, L. Antiga, and A. Lerer, "Automatic differentiation in PyTorch," in NeurIPS Workshop, 2017.

V. Usenko, N. Demmel, D. Schubert, J. Stueckler, and D. Cremers, "Visual-inertial mapping with non-linear factor recovery," IEEE Robotics and Automation Letters, vol. 5, No. 2, pp. 422-429, 2020.

E. Olson, "AprilTag: A robust and flexible visual fiducial system," in Proceedings of the IEEE International Conference on Robotics and Automation (ICRA), 2011, pp. 3400-3407.

C. Godard, O. Mac Aodha, and G. J. Brostow, "Unsupervised monocular depth estimation with left-right consistency," in Proceedings of the IEEE Conference on Computer Vision and Pattern Recognition (CVPR), 2017.

Z. Wang, A. C. Bovik, H. R. Sheikh, and E. P. Simoncelli, "Image quality assessment: from error visibility to structural similarity," IEEE Transactions on Image Processing, vol. 13, No. 4, pp. 600-612, 2004.

M. Jaderberg, K. Simonyan, A. Zisserman, and K. Kavukcuoglu, "Spatial transformer networks," arXiv preprint arXiv:1506.02025, 2015.

A. Gordon et al., "Depth from Videos in the Wild: Unsupervised Monocular Depth Learning from Unknown Cameras," IEEE/CVF International Conference on Computer Vision (ICCV), 2019, pp. 8977-8986, available at https://openaccess.thecvf.com/content_ICCV_2019/papers/Gordon_Depth_From_Videos_in_the_Wild_Unsupervised_Monocular_Depth_Learning_ICCV_2019_paper.pdf.

I. Vasiljevic et al., "Neural Ray Surfaces for Self-Supervised Learning of Depth and Ego-Motion," arXiv:2008.06630v1 [cs.CV], Aug. 15, 2020, available at https://arxiv.org/pdf/2008.06630.pdf.

R. Gong et al., "Self-Calibration Supported Robust Projective Structure-from-Motion," arXiv:2007.02045v1 [cs.CV], Jul. 4, 2020, found at https://arxiv.org/pdf/2007.02045.pdf.

J. Fan et al., "Wide-Angle Image Rectification: A Survey," arXiv:2011.12108v1 [cs.CV], Oct. 30, 2020.

* cited by examiner

SYSTEMS AND METHODS FOR SELF-SUPERVISED LEARNING OF CAMERA INTRINSIC PARAMETERS FROM A SEQUENCE OF IMAGES

CROSS-REFERENCE TO RELATED APPLICATION

This application claims the benefit of U.S. Provisional Patent Application No. 63/243,463, "Self-Supervised Camera Self-Calibration from Video," filed Sep. 13, 2021, which is incorporated by reference herein in its entirety.

TECHNICAL FIELD

The subject matter described herein relates in general to machine vision and, more specifically, to systems and methods for self-supervised learning of camera intrinsic parameters from a sequence of images.

BACKGROUND

Camera calibration (ascertaining the intrinsic parameters of a particular camera) is integral to robotics and computer vision algorithms that seek to infer geometric properties of a scene from a visual input stream such as a sequence of images (e.g., video). In practice, calibration can be a laborious procedure requiring specialized data collection and careful tuning. Moreover, this process might need to be repeated, if the parameters of the camera change, which can occur frequently in applications such as mobile robots and autonomous vehicles.

SUMMARY

An example of a system for self-supervised learning of camera intrinsic parameters from a sequence of images is presented herein. The system comprises one or more processors and a memory communicably coupled to the one or more processors. The memory stores a proxy-task estimation module including instructions that when executed by the one or more processors cause the one or more processors to process, using a depth network, a current image frame captured by a camera to produce a depth map. The proxy-task estimation module also includes instructions that when executed by the one or more processors cause the one or more processors to generate a point cloud from the depth map using a differentiable unprojection operation based on a set of estimated camera intrinsic parameters associated with a parametric camera model. The proxy-task estimation module also includes instructions that when executed by the one or more processors cause the one or more processors to process, using a pose network, the current image frame and a context image frame captured by the camera to produce a camera pose estimate. The memory also stores a calibration module including instructions that when executed by the one or more processors cause the one or more processors to warp the point cloud based on the camera pose estimate to produce a warped point cloud. The calibration module also includes instructions that when executed by the one or more processors cause the one or more processors to generate a warped image frame from the warped point cloud using a differentiable projection operation based on the set of estimated camera intrinsic parameters. The calibration module also includes instructions that when executed by the one or more processors cause the one or more processors to compare the warped image frame with the context image frame to produce a self-supervised photometric loss. The calibration module also includes instructions that when executed by the one or more processors cause the one or more processors to update the set of estimated camera intrinsic parameters on a per-image-sequence basis using one or more gradients from the self-supervised photometric loss. The memory also stores an image rectification module including instructions that when executed by the one or more processors cause the one or more processors to generate, based on a learned set of camera intrinsic parameters to which the set of estimated camera intrinsic parameters has converged in accordance with one or more predetermined convergence criteria, a rectified image frame from an image frame captured by the camera, wherein the rectified image frame corrects distortion in the image frame.

Another embodiment is a non-transitory computer-readable medium for self-supervised learning of camera intrinsic parameters from a sequence of images and storing instructions that when executed by one or more processors cause the one or more processors to process, using a depth network, a current image frame captured by a camera to produce a depth map. The instructions also cause the one or more processors to generate a point cloud from the depth map using a differentiable unprojection operation based on a set of estimated camera intrinsic parameters associated with a parametric camera model. The instructions also cause the one or more processors to process, using a pose network, the current image frame and a context image frame captured by the camera to produce a camera pose estimate. The instructions also cause the one or more processors to warp the point cloud based on the camera pose estimate to produce a warped point cloud. The instructions also cause the one or more processors to generate a warped image frame from the warped point cloud using a differentiable projection operation based on the set of estimated camera intrinsic parameters. The instructions also cause the one or more processors to compare the warped image frame with the context image frame to produce a self-supervised photometric loss. The instructions also cause the one or more processors to update the set of estimated camera intrinsic parameters on a per-image-sequence basis using one or more gradients from the self-supervised photometric loss. The instructions also cause the one or more processors to generate, based on a learned set of camera intrinsic parameters to which the set of estimated camera intrinsic parameters has converged in accordance with one or more predetermined convergence criteria, a rectified image frame from an image frame captured by the camera, wherein the rectified image frame corrects distortion in the image frame.

Another embodiment is a method of self-supervised learning of camera intrinsic parameters from a sequence of images, the method comprising processing, using a depth network, a current image frame captured by a camera to produce a depth map. The method also includes generating a point cloud from the depth map using a differentiable unprojection operation based on a set of estimated camera intrinsic parameters associated with a parametric camera model. The method also includes processing, using a pose network, the current image frame and a context image frame captured by the camera to produce a camera pose estimate. The method also includes warping the point cloud based on the camera pose estimate to produce a warped point cloud. The method also includes generating a warped image frame from the warped point cloud using a differentiable projection operation based on the set of estimated camera intrinsic parameters. The method also includes comparing the warped image frame with the context image frame to produce a self-supervised photometric loss. The method also includes updating the set of estimated camera intrinsic parameters on a per-image-sequence basis using one or more gradients from the self-supervised photometric loss. The method also includes generating, based on a learned set of camera intrinsic parameters to which the set of estimated camera intrinsic parameters has converged in accordance with one or more predetermined convergence criteria, a rectified image frame from an image frame captured by the camera, wherein the rectified image frame corrects distortion in the image frame.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Figure 1:
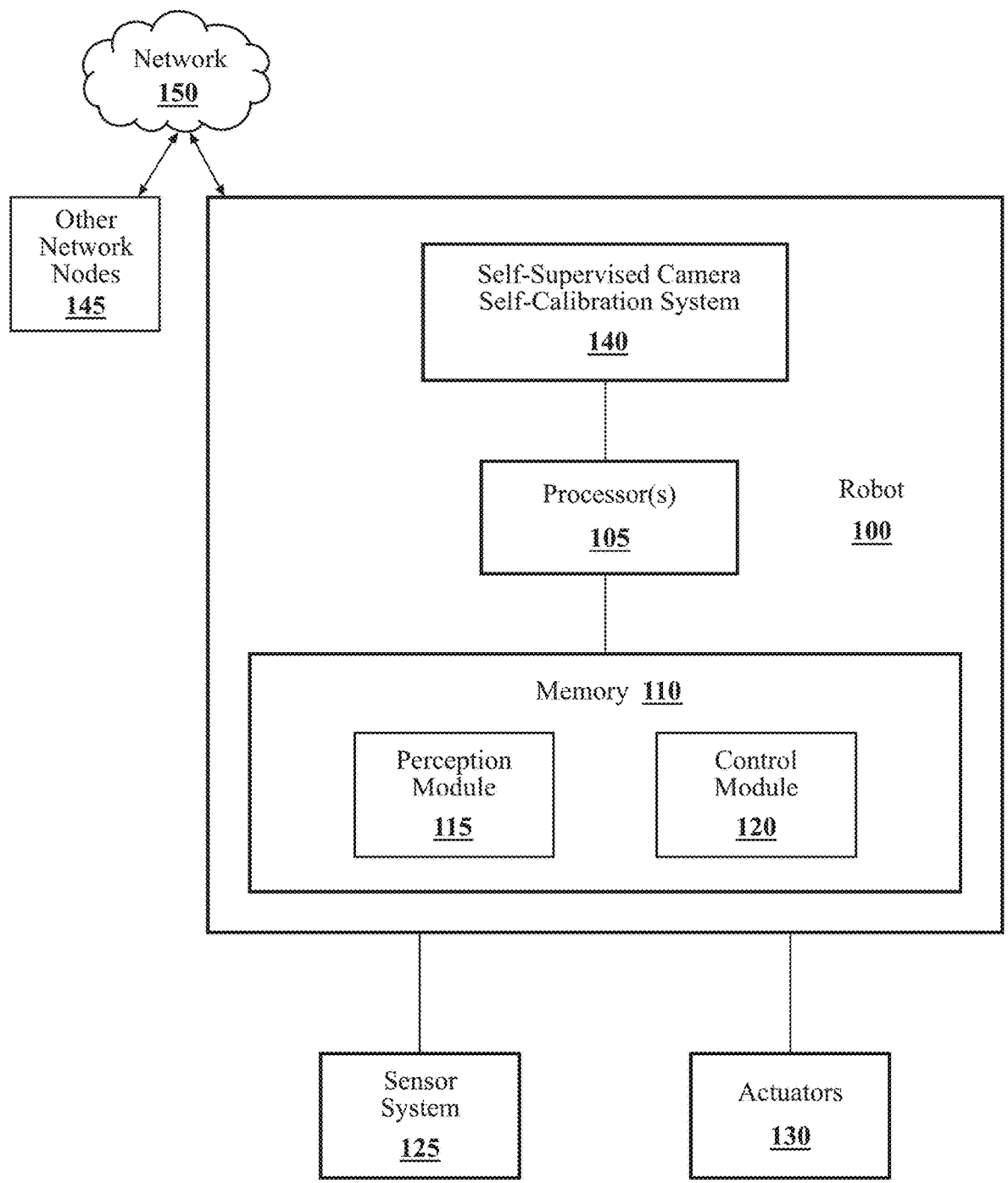
FIG. 1 is a block diagram of a robot, in accordance with an illustrative embodiment of the invention.

Some conventional computer-vision systems include self-supervised depth and ego-motion (camera-pose) estimation approaches that bypass explicit camera calibration by inferring per-frame projection models that optimize a view-synthesis objective. In various embodiments described herein, such a self-supervised approach is extended and improved upon to explicitly calibrate a wide range of cameras from raw sequences of images (e.g., videos) in the wild. These embodiments include a machine-learning algorithm that regresses per-sequence (as opposed to per-frame) calibration parameters using an efficient family of general camera models such as a Unified Camera Model (UCM). In some embodiments, other parametric camera models are employed, such as a pinhole camera model, an Extended Unified Camera Model (EUCM), or a Double Sphere (DS) Camera Model. The embodiments described herein can achieve self-calibration results with sub-pixel reprojection error, outperforming conventional learning-based methods.

In the various embodiments disclosed herein, a self-supervised camera self-calibration system accomplishes the objectives mentioned above using self-supervised depth and pose learning as a proxy objective to enable the learning of camera intrinsic parameters entirely from self-supervision. These embodiments include the use of differentiable unprojection and projection operations, as described in greater detail below. Such a self-supervised camera self-calibration system can learn camera intrinsic parameters from radically different datasets, learning depth and pose on perspective, fisheye, and catadioptric images without architectural changes.

Once a particular camera's intrinsic parameters have been learned through the self-supervised learning techniques described herein, a rectified image frame that corrects for distortion in the original image frame can be generated for any image frame in the dataset (e.g., video) captured by the camera in question. Such a rectified image frame can be used by any of a variety of downstream processes in a robot, and the operation (movement, decision making, etc.) of the robot can be controlled based, at least in part, on the rectified image frame. Some examples of a robot in which the principles and techniques described herein can be applied include, without limitation, a manually driven vehicle that includes an Advanced Driver-Assistance System (ADAS) or other system that semi-autonomously assists a human driver, an autonomous vehicle, an indoor robot, and an aerial drone.

In other embodiments, the techniques described herein can be implemented in an environment other than a robot (e.g., a server or other computing system). For example, in some embodiments, a camera's intrinsic parameters are learned via the techniques described herein in a setting separate from and possibly remote from a robot (e.g., a server at a research and development center), and the weights of the trained depth and pose estimation networks and associated learned camera intrinsic parameters are downloaded to a robot. In some embodiments, a robot so equipped refines the downloaded models and associated learned camera intrinsic parameters through ongoing machine learning.

In some embodiments, a robot includes a self-supervised camera self-calibration system that, if a perturbation (e.g., physical vibration or jarring) occurs that changes one or more of the camera's characteristics, the system, in response, automatically performs the techniques described herein to re-learn the now-altered camera intrinsic parameters.

The remainder of this Detailed Description is organized as follows. First, a high-level overview of various embodiments of a self-supervised camera self-calibration system deployed in a robot is provided in connection with a discussion of FIGS. 1 and 2. Second, a more detailed explanation of the underlying mathematical principles and of a particular embodiment and its system architecture follows in connection with a discussion of FIGS. 3-5. Finally, the methods employed in various embodiments are discussed in connection with the flowchart of FIG. 6.

Referring to FIG. 1, it is a block diagram of a robot 100, in accordance with an illustrative embodiment of the invention. Robot 100 can be any of a variety of different kinds of robots. For example, in some embodiments, robot 100 is a manually driven vehicle equipped with an ADAS or other system that performs analytical and decision-making tasks to assist a human driver. Such a manually driven vehicle is thus capable of semi-autonomous operation to a limited extent in certain situations (e.g., adaptive cruise control, collision avoidance, lane-change assistance, parking assistance, etc.). In other embodiments, robot 100 is an autonomous vehicle that can operate, for example, at industry defined Autonomy Levels 3-5. Herein, the term "autonomous vehicle" encompasses specialized outdoor robots such as search-and-rescue robots and delivery robots. In still other embodiments, robot 100 can be a mobile or fixed indoor robot (e.g., a service robot, hospitality robot, companionship robot, manufacturing robot, etc.). In still other embodiments, robot 100 can be an autonomous or semi-autonomous aerial drone. The foregoing examples of robots are not intended to be limiting.

Robot 100 includes various elements. It will be understood that, in various implementations, it may not be necessary for robot 100 to have all of the elements shown in FIG. 1. The robot 100 can have any combination of the various elements shown in FIG. 1. Further, robot 100 can have additional elements to those shown in FIG. 1. In some arrangements, robot 100 may be implemented without one or more of the elements shown in FIG. 1, including self-supervised camera self-calibration system 140. While the various elements are shown as being located within robot 100 in FIG. 1, it will be understood that one or more of these elements can be located external to the robot 100. Further, the elements shown may be physically separated by large distances.

In FIG. 1, robot 100 is shown as including one or more processors 105. Robot 100 also includes a memory 110 communicably coupled to the one or more processors 105. The memory 110 stores a perception module 115 and a control module 120. The memory 110 is a random-access memory (RAM), read-only memory (ROM), a hard-disk drive, a flash memory, or other suitable memory for storing the modules 115 and 120. The modules 115 and 120 are, for example, computer-readable instructions that when executed by the one or more processors 105, cause the one or more processors 105 to perform the various functions disclosed herein. More specifically, perception module 115 generally includes instructions that when executed by the one or more processors 105 cause the one or more processors 105 to analyze and perceive the environment surrounding the robot 100 based on, e.g., data from sensor system 125 and other information derived therefrom or received from other sources (e.g., servers, other robots, etc.). Control module 120 generally includes instructions that when executed by the one or more processors 105 cause the one or more processors 105 to control the operation of robot 100. This is based, at least in part, on the information about the environment obtained from perception module 115. In the embodiment shown in FIG. 1, perception module 115 is supported by a self-supervised camera self-calibration system 140, which is the focus of the remainder of this description. As mentioned above, in some embodiments, a self-supervised camera self-calibration system in accordance with the principles and techniques disclosed herein can be implemented in an environment other than a robot 100 (e.g., in a server or other computing system).

As shown in FIG. 1, robot 100 can communicate with other network nodes 145 (servers, client computers, mobile devices, other robots, etc.) via a network 150. In some embodiments, network 150 includes the Internet. Network 150 can include any of a variety of wired (e.g., Ethernet) and/or wireless (LTE, 5G, WiFi, Bluetooth, etc.) communication technologies. As also shown in FIG. 1, robot 100 includes a sensor system 125 to perceive its environment and one or more actuators 130 to perform physical tasks and otherwise interact with its environment (e.g., to navigate, stop/go, accelerate, decelerate, steer, maneuver, grasp objects, etc.). One important function of the communication capabilities of robot 100, in some embodiments, is receiving executable program code and/or model weights and parameters for trained neural networks that form part of self-supervised camera self-calibration system 140. As discussed above, in some embodiments, those neural networks can be trained on a different system (e.g., a server) at a different location, and the model weights and parameters of the trained neural networks can be downloaded to robot 100 over network 150. Such an arrangement also supports timely software and/or firmware updates.

Figure 2:
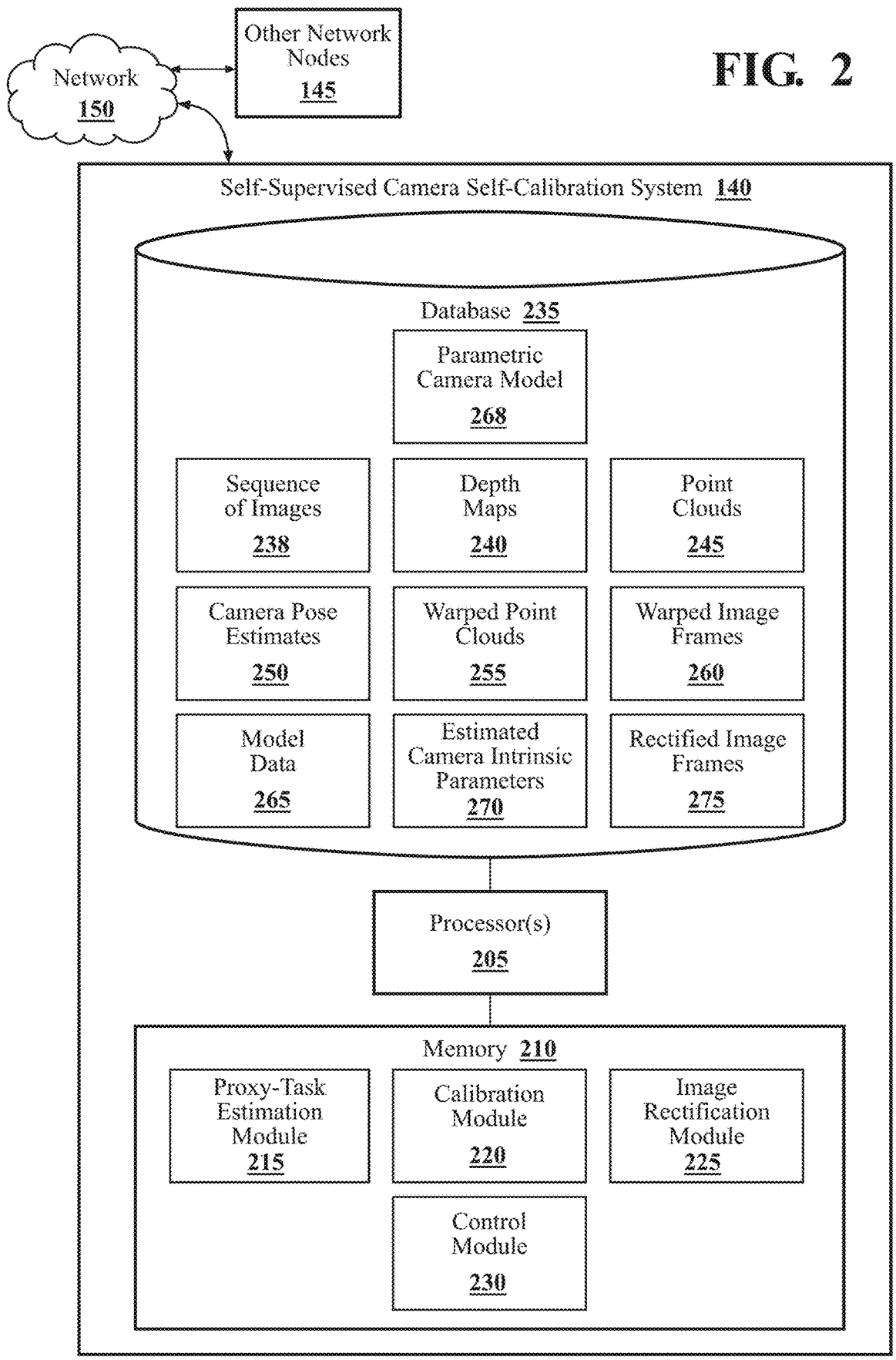
FIG. 2 is a functional block diagram of a self-supervised camera self-calibration system, in accordance with an illustrative embodiment of the invention.

FIG. 2 is a functional block diagram of a self-supervised camera self-calibration system 140, in accordance with an illustrative embodiment of the invention. In FIG. 2, self-supervised camera self-calibration system 140 is shown as including one or more processors 205. The one or more processors 205 may coincide with the one or more processors 105 of robot 100, self-supervised camera self-calibration system 140 may include one or more processors that are separate from the one or more processors 105 of robot 100, or self-supervised camera self-calibration system 140 may access the one or more processors 205 through a data bus or another communication path, depending on the embodiment.

Self-supervised camera self-calibration system 140 also includes a memory 210 communicably coupled to the one or more processors 205. The memory 210 may be coincident with the memory 110 of robot 100, or it may be a separate memory, depending on the embodiment. The memory 210 stores a proxy-task estimation module 215, a calibration module 220, an image rectification module 225, and a control module 230. The memory 210 is a random-access memory (RAM), read-only memory (ROM), a hard-disk drive, a flash memory, or other suitable memory for storing the modules 215, 220, 225, and 230. The modules 215, 220, 225, and 230 are, for example, computer-readable instructions that when executed by the one or more processors 205, cause the one or more processors 205 to perform the various functions disclosed herein.

In connection with its tasks, self-supervised camera self-calibration system 140 can store various kinds of data in a database 235. For example, in the embodiment shown in FIG. 2, self-supervised camera self-calibration system 140 stores, in database 235, sequences of images (e.g., videos) 238, depth maps 240, point clouds 245, camera pose estimates 250, warped point clouds 255, warped image frames 260, model data 265, estimated camera intrinsic parameters 270, and rectified images 275. These various types of data are discussed in greater detail below. Model data 265 includes data associated with the depth and ego-motion (camera-pose) neural networks used in learning the proxy objectives, hyperparameters, the results of intermediate calculations, loss functions (e.g., a photometric loss function discussed in greater detail below), etc.

As shown in FIG. 2, by virtue of the capabilities included in robot 100, self-supervised camera self-calibration system 140 can communicate with other network nodes 145 (servers, client computers, robots, mobile devices, etc.) via network 150.

Proxy-task estimation module 215 generally includes instructions that when executed by the one or more processors 205 cause the one or more processors 205 to process, using a depth network, a current image frame in a sequence of images 238 (e.g., video) captured by a camera to produce a depth map 240. As those skilled in the art are aware, a "depth network" is a neural network that learns how to predict (estimate) pixel-by-pixel depth in an image—the distance of each pixel from the camera. A "depth map" is an image in which the intensity of each pixel represents the distance of that pixel from the camera or vantage point from which the image was created. Proxy-task estimation module 215 also includes instructions that when executed by the one or more processors 205 cause the one or more processors 205 to generate a three-dimensional (3D) point cloud 245 from the depth map using a differentiable unprojection operation based on a set of estimated camera intrinsic parameters 270 associated with a parametric camera model 268. The estimated camera intrinsic parameters 270, the differentiable unprojection operation, and various parametric camera models 268, in particular a UCM, are discussed in greater detail below.

Proxy-task estimation module 215 also includes instructions that when executed by the one or more processors 205 cause the one or more processors 205 to process, using a pose network, the current image frame and a context image frame captured by the camera to produce a camera pose estimate 250. As those skilled in the art are aware, a "pose network" is a neural network that learns how to predict (estimate) the ego motion (motion of the camera relative to the scene) or "camera pose" between two image frames. In this case, the two image frames of interest are the current image frame in a sequence of images 238 and a context image frame of the same scene captured by the same camera but from a different viewpoint (i.e., at a different point in time at which the camera was in a different position than that in which it captured the current image frame). For example, the context image frame could be a consecutive (adjacent) image frame in the sequence of images relative to the current image frame, either immediately preceding or immediately following the current image frame. In other embodiments, the current image frame and the context image frame are not necessarily consecutive image frames. They might be separated by a few image frames, for example.

Calibration module 220 generally includes instructions that when executed by the one or more processors 205 cause the one or more processors 205 to warp the 3D point cloud 245 based on the camera pose estimate 250 discussed above to produce a warped 3D point cloud 255. Calibration module 220 also includes instructions that when executed by the one or more processors 205 cause the one or more processors 205 to generate a warped image frame 260 from the warped point cloud 255 using a differentiable projection operation based on the set of estimated camera intrinsic parameters 270. The warping processes and the differentiable projection operation mentioned above are discussed in greater detail below in connection with FIG. 4.

Calibration module 220 also includes instructions that when executed by the one or more processors 205 cause the one or more processors 205 to compare the warped image frame 260 with the context image frame to produce a self-supervised photometric loss that is defined and discussed in greater detail below. Calibration module 220 also includes instructions that when executed by the one or more processors 205 cause the one or more processors 205 to update the set of estimated camera intrinsic parameters 270 on a per-image-sequence basis using one or more gradients from the self-supervised photometric loss. As discussed above, one of the significant advantages of the embodiments of a self-supervised camera self-calibration system 140 described herein is that a set of estimated camera intrinsic parameters 270 is learned on a per-sequence or per-dataset basis instead of the per-image-frame camera-intrinsic-parameter estimation employed by conventional self-calibration systems. The set of estimated camera intrinsic parameters 270 can be updated iteratively as all or a portion of a sequence of images 238 is processed until the set of estimated camera intrinsic parameters 270 converges to a set of "learned" camera intrinsic parameters in accordance with one or more predetermined convergence criteria (e.g., until the change in the parameters from iteration to iteration falls below a predetermined threshold).

In some embodiments, calibration module 220 includes instructions that when executed by the one or more processors 205 cause the one or more processors 205 to learn the "learned" (converged) set of camera intrinsic parameters discussed above in response to a perturbation of the camera that changes one or more of its characteristics. As discussed above, in some embodiments, this re-learning of the camera intrinsic parameters on the fly can be performed automatically, when self-calibration system 140 detects that a perturbation of the camera has occurred.

Image rectification module 225 generally includes instructions that when executed by the one or more processors 205 cause the one or more processors 205 to generate, based on a learned set of camera intrinsic parameters to which the set of estimated camera intrinsic parameters 270 has converged in accordance with one or more predetermined convergence criteria, a rectified image frame 275 from an image frame captured by the camera. As mentioned above, the rectified image frame 275 corrects for distortion in the original input image frame. For example, the camera that captured the original image frame might be a fisheye camera. Once the converged set of camera intrinsic parameters has been generated through an iterative process using the techniques described herein, image rectification module 225 can produce a rectified image frame 275 for any image frame in a sequence of images 238 captured by the camera in question. As those skilled in the art are aware, knowledge of a camera's intrinsic parameters permits distortion in output images captured by that camera to be compensated for mathematically. The above concepts regarding converged camera intrinsic parameters and rectified image frames 275 are summarized in FIG. 3.

Figure 3:
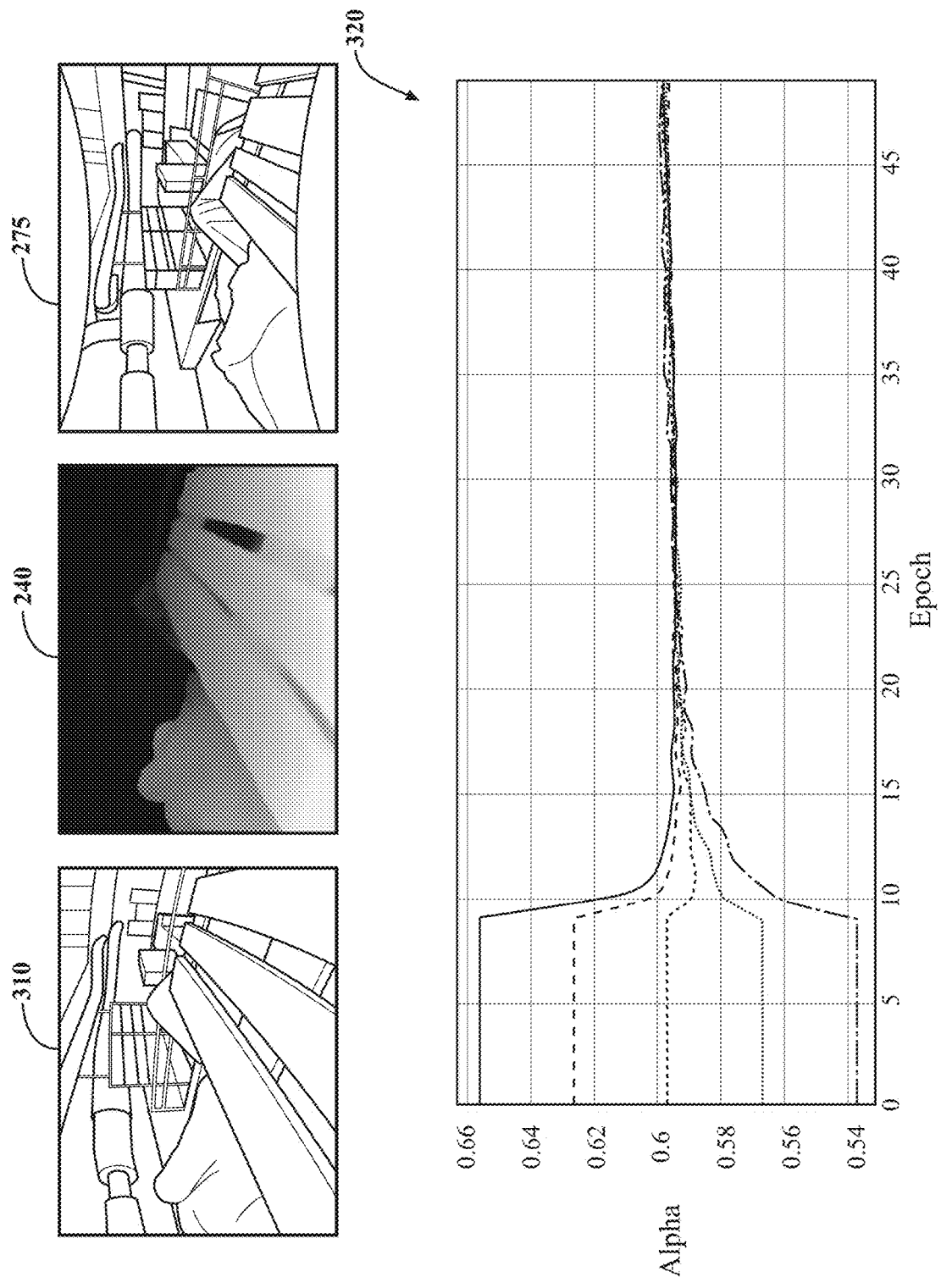
FIG. 3 illustrates producing a rectified image via a self-supervised self-calibration procedure, in accordance with an illustrative embodiment of the invention.

FIG. 3 illustrates producing a rectified image 275 through a self-supervised camera self-calibration procedure, in accordance with an illustrative embodiment of the invention. FIG. 3 includes an illustrative input image frame 310, a depth map 240, and a rectified image frame 275. FIG. 3 also includes a graph 320 showing how, following the perturbation of a camera intrinsic parameter (in this example, the a parameter in a UCM), self-supervised camera self-calibration system 140 can perform on-the-fly re-calibration to recover from the perturbation. In graph 320, the different curves represent different degrees of perturbation relative to the correct value of the parameter $\alpha$. As discussed above, in some embodiments, if a perturbation (e.g., physical vibration or jarring) occurs that changes one or more of the camera's intrinsic parameters, self-supervised camera self-calibration system 140, in response, automatically performs the techniques described herein to re-learn the now-altered camera intrinsic parameters on the fly.

Some downstream processes in a robot 100 (e.g., object detection, object identification, object tracking, etc.) do not work as well with distorted images (i.e., images produced by a camera, such as a fisheye camera, that causes distortion in the output images). Learning the camera's intrinsic parameters through the techniques described herein and producing rectified images 275 through knowledge of those intrinsic parameters improves the performance of these downstream processes.

Control module 230 generally includes instructions that when executed by the one or more processors 205 cause the one or more processors 205 to control operation of the robot 100 based, at least in part, on the rectified image frame 275. In some embodiments, control module 230 is coincident with control module 120 discussed above in connection with FIG. 1. In other embodiments, control module 230 is separate from control module 120, but the two control modules operate in coordination with each other. In this context, to "control operation of the robot 100" means to control any aspect of the robot's operation. Examples include the robot's movement trajectory (if the robot is mobile), stopping/going, acceleration, deceleration, actions of various actuators 130, user interfaces, and other interactions of the robot 100 with its environment. A more specific example is an autonomous vehicle. Controlling such a robot includes controlling steering, acceleration, braking, turn signals, and other automated-driving features.

This description next turns to a more detailed explanation of the underlying mathematical concepts employed in self-supervised camera self-calibration system 140 and a more detailed description of a particular embodiment of a self-supervised camera self-calibration system 140 and its associated architecture.

Figure 4:
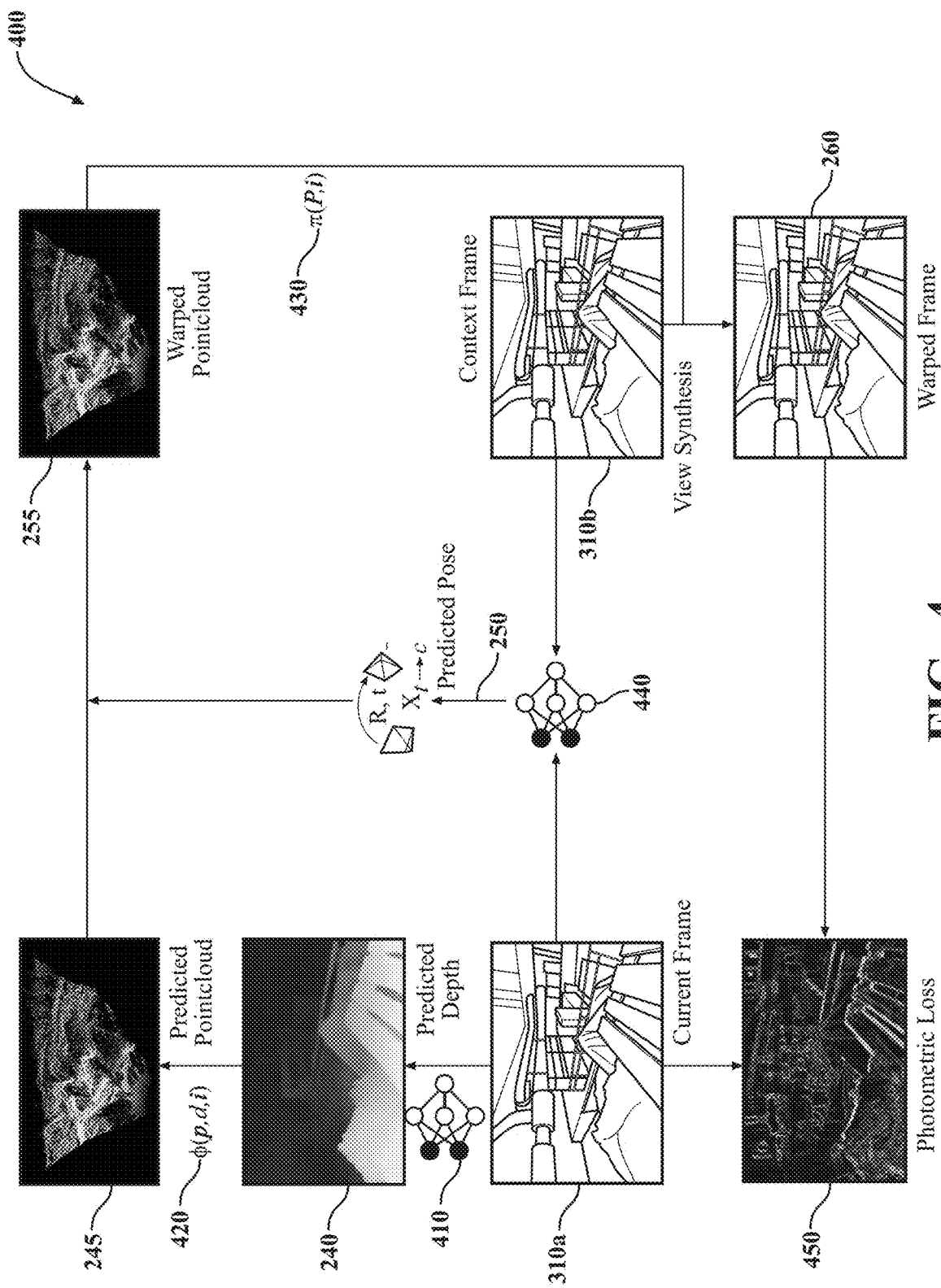
FIG. 4 illustrates an architecture of a self-supervised camera self-calibration system, in accordance with an illustrative embodiment of the invention.

FIG. 4 illustrates an architecture 400 of a self-supervised camera self-calibration system 140, in accordance with an illustrative embodiment of the invention. Self-supervised depth and ego-motion (camera-pose) components include a depth network 410 that produces depth maps $\hat{D}_t$ (240) for a target image $I_t$ (current frame 310a), as well as a pose network 440 that predicts the relative rigid-body transformation between target t and context c frames (context image frame 310b), $$\hat{X}^{t \to c} = \begin{pmatrix} \hat{R}^{t \to c} & \hat{t}^{t \to c} \\ 0 & 1 \end{pmatrix} \in SE(3),$$

where SE(3) refers to the Special Euclidean Group in 3D space. The networks (410 and 440) are trained jointly by minimizing the reprojection error (photometric loss 450) between the actual target image $I_t$ (current image frame 310a) and a synthesized image $\hat{I}_t$ (warped image frame 260) generated by projecting pixels from the context image frame 310b $I_c$ (in some embodiments, a frame immediately preceding or following $I_t$ 310 a in a sequence of images 238) onto the target image $I_t$ (current frame 310a) using the predicted depth map $\hat{D}_t$ (240) and ego-motion (camera pose) $\hat{X}^{t \to c}$. Mathematically, the photometric loss 450 is defined as follows:

$$\mathcal{L}_p(I_t, \hat{I}_t) = \alpha \frac{1 - SSIM(I_t, \hat{I}_t)}{2} + (1 - \alpha)\|I_t - \hat{I}_t\|,$$

where SSIM denotes a structure similarity metric and a is an intrinsic parameter of a UCM camera model that is discussed in greater detail below.

As shown in FIG. 4, a point cloud 245 is generated from depth map $\hat{D}_t$ (240) via an unprojection operation $\phi(p, \hat{d}, i)$ (420). A warped point cloud 255 is generated from the point cloud 245 based on the camera pose estimate 250, and a warped image frame 260 (synthesized image $\hat{I}_t$) is generated from the warped point cloud 255 via a projection operation $\pi(P, i)$ (430).

The general pixel-warping operation is defined as follows:

$$\hat{p}^t = \pi(\hat{R}^{t \to c} \phi(p^t, \hat{d}^t, i) + \hat{t}^{t \to c}, i),$$

where i are estimated camera intrinsic parameters 270 modeling the geometry of the camera. These intrinsic parameters (270) come into play for both projection of 3D points P (430) onto image pixels p via $\pi(P, i) = p$ and unprojection via $\phi(p, \hat{d}, i) = P$, assuming an estimated pixel depth of $\hat{d}$. The specifics of the estimated camera intrinsic parameters i (270) differ, depending on the particular embodiment. In some embodiments, the estimated camera intrinsic parameters 270 correspond to the standard pinhole model defined by the well-known 3×3 intrinsic matrix K (focal length in x and y coordinates and principal points in x and y coordinates). In other embodiments, the estimated camera intrinsic parameters 270 correspond to a different kind of differentiable camera model such as a UCM, a EUCM, or a DS. A UCM family is described in greater detail below.

Figure 5:
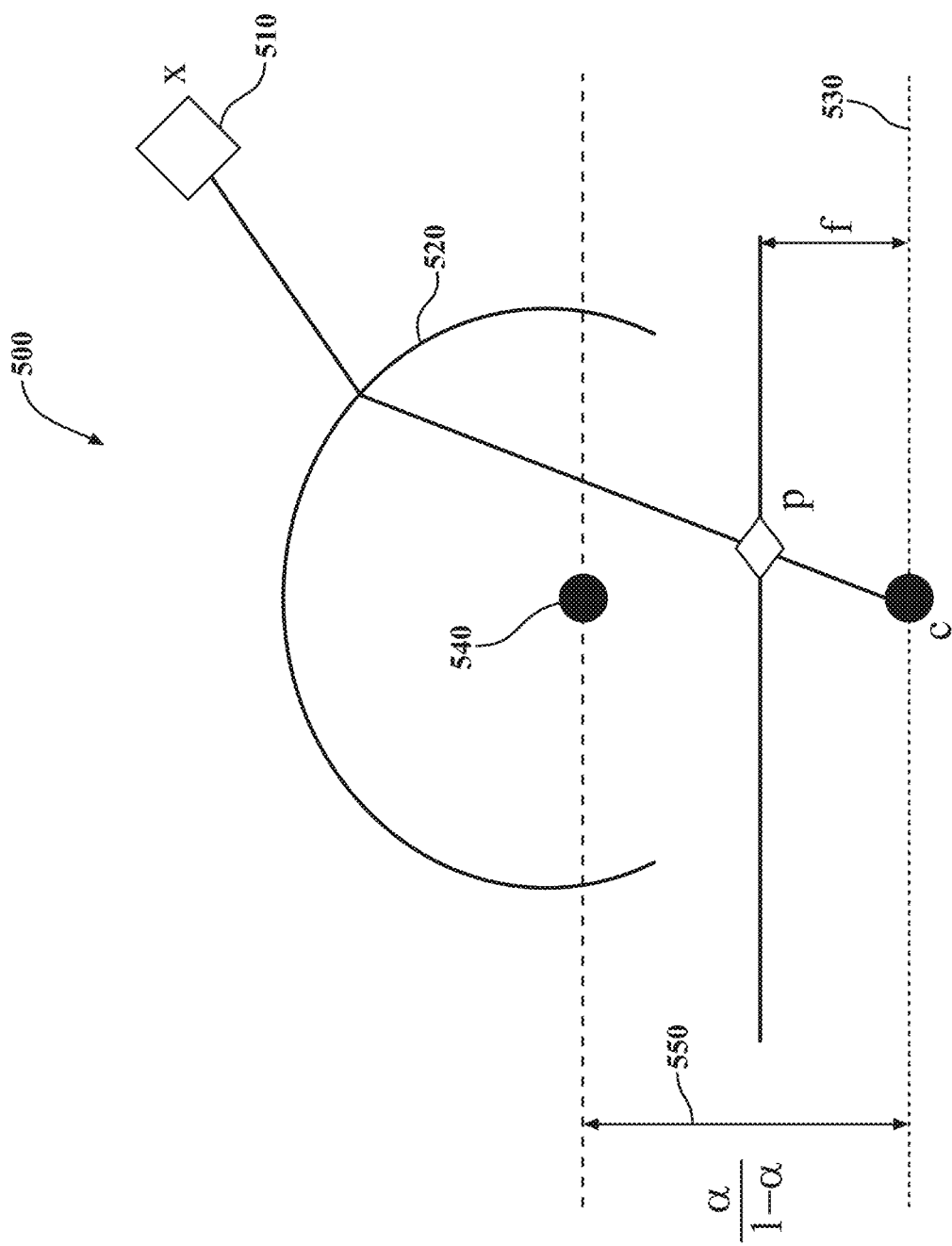
FIG. 5 illustrates a Unified Camera Model, in accordance with an illustrative embodiment of the invention.

FIG. 5 illustrates a UCM 500, in accordance with an illustrative embodiment of the invention. UCM 500 is a parametric global central camera model that uses only five parameters to represent a diverse set of camera geometries, including perspective, fisheye, and catadioptric. A 3D point X (510) is projected onto a unit sphere 520 and then projected onto the image plane 530 of a pinhole camera, shifted by $$\frac{\alpha}{1 - \alpha}$$

(550) from the center 540 of the sphere 520.

The EUCM and DS models are two extensions of the UCM model. EUCM replaces the unit sphere with an ellipse as the first projection surface, and DS replaces the single unit sphere with two unit spheres in the projection process. Depending on the embodiment, any of these differentiable parametric camera models (pinhole, UCM, EUCM, and DS) can be used.

In one embodiment, self-supervised camera self-calibration system 140 employs a UCM model that extends the pinhole camera model ($f_x, f_y, c_x, c_y$) with only one additional parameter $\alpha$ (refer to the discussion of FIG. 5 above). The 3D-to-2D projection of P=(x, y, z) (430) is defined as $$\pi(P, i) = \begin{bmatrix} f_x \dfrac{x}{\alpha d + (1 - \alpha)z} \\ f_y \dfrac{y}{\alpha d + (1 - \alpha)z} \end{bmatrix} + \begin{bmatrix} c_x \\ c_y \end{bmatrix},$$

where the camera parameters are i=($f_x, f_y, c_x, c_y, \alpha$) and d=$\sqrt{x^2+y^2+z^2}$. The unprojection operation (420) of pixel p=(u, v, 1) at estimated depth $\hat{d}$ is as follows:

$$\phi(p, \hat{d}, i) = \hat{d} \frac{\xi + \sqrt{1 + (1 - \xi^2)r^2}}{1 + r^2} \begin{bmatrix} m_x \\ m_y \\ 1 \end{bmatrix} - \begin{bmatrix} 0 \\ 0 \\ \hat{d}\xi \end{bmatrix},$$

where

-continued
$$m_x = \frac{u - c_x}{f_x}(1 - \alpha), m_y = \frac{v - c_y}{f_y}(1 - \alpha), r^2 = m_x^2 + m_y^2, \text{ and } \xi = \frac{\alpha}{1 - \alpha}.$$

As can be seen from the projection and unprojection equations above, the UCM camera model provides closed-form projection and unprojection functions that are both differentiable. Therefore, the overall architecture depicted in FIG. 4 is end-to-end differentiable with respect to both neural network parameters (for pose and depth estimation) and camera intrinsic parameters (270). This enables learning self-calibration end-to-end from the proxy view-synthesis objective alone. In some embodiments, at the beginning of the self-supervised depth and pose training process, rather than pre-calibrating the camera parameters, the camera intrinsic parameters 270 are initialized with "default" values based on image shape only. Although the projection 430 and unprojection 420 operations are initially inaccurate, they quickly converge to highly accurate learned camera intrinsic parameters with sub-pixel re-projection error.

The approach described herein combines flexibility with computational efficiency, enabling learning from heterogeneous datasets with potentially vastly differing sensors for which separate intrinsic parameters i are learned. In some embodiments, since most of the parameters in the depth and pose networks (410 and 440) are shared thanks to the decoupling of the projection model, this enables scaling up in-the-wild training of the depth and pose networks (410 and 440). Moreover, the approach described herein is efficient, requiring only one extra parameter relative to a pinhole camera model. This supports learning depth for highly distorted catadioptric cameras at a much higher resolution than conventional over-parameterized models. It is important to note that, in contrast with conventional solutions, the embodiments described herein learn camera intrinsic parameters per-sequence (per-dataset) rather than per-frame. This increases stability compared with conventional per-frame methods that exhibit frame-to-frame variability, and the techniques described herein can be applied to sequences of images 238 of varying sizes.

Figure 6:
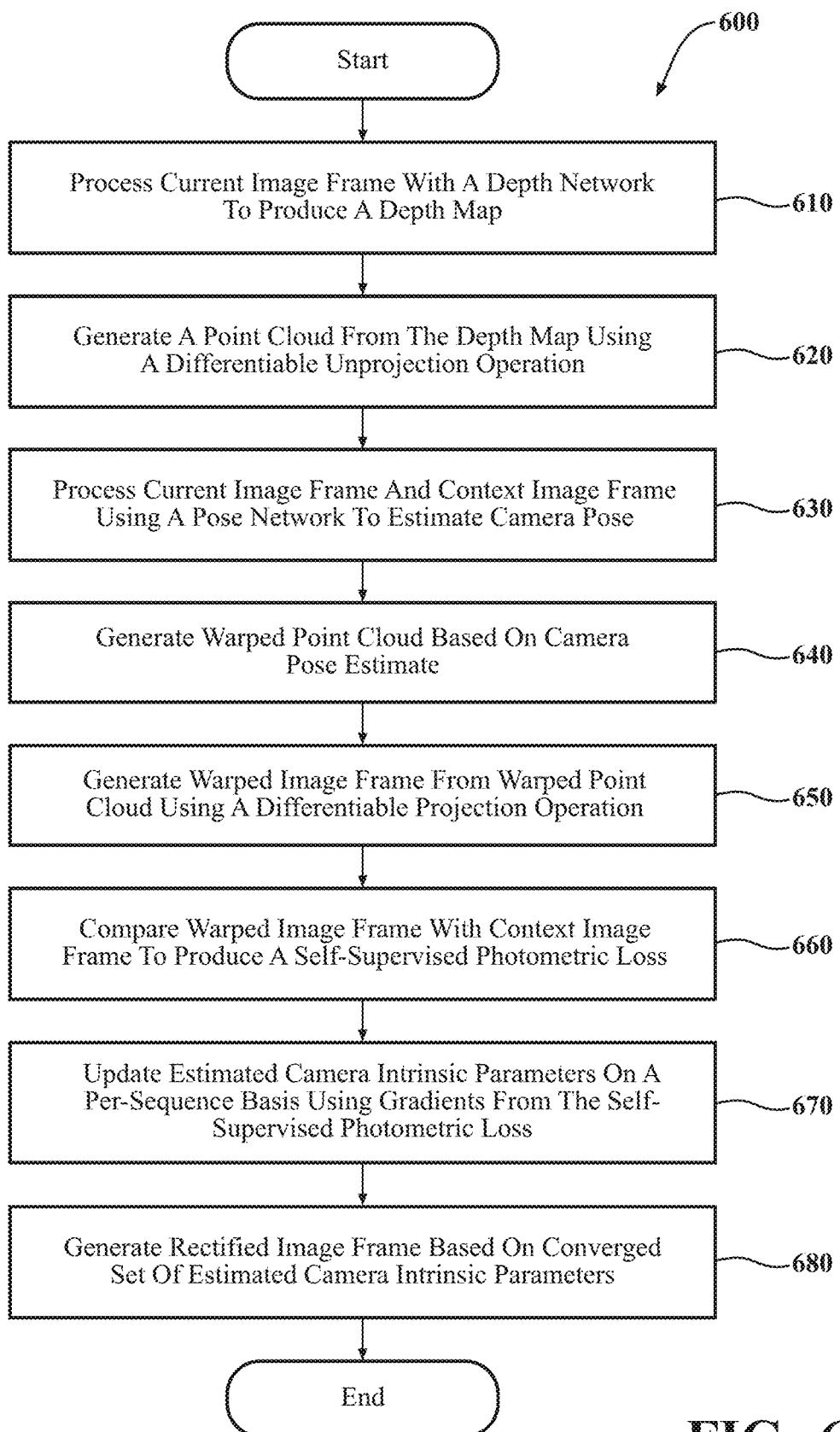
FIG. 6 is a flowchart of a method of self-supervised learning of camera intrinsic parameters from a sequence of images, in accordance with an illustrative embodiment of the invention.

FIG. 6 is a flowchart of a method 600 of self-supervised learning of camera intrinsic parameters from a sequence of images, in accordance with an illustrative embodiment of the invention. Method 600 will be discussed from the perspective of self-supervised camera self-calibration system 140 in FIG. 2 with reference to FIGS. 3-5. While method 600 is discussed in combination with self-supervised camera self-calibration system 140, it should be appreciated that method 600 is not limited to being implemented within self-supervised camera self-calibration system 140, but self-supervised camera self-calibration system 140 is instead one example of a system that may implement method 600.

At block 610, proxy-task estimation module 215 processes, using a depth network 410, a current image frame 310*a* captured by a camera to produce a depth map 240. As discussed above, a "depth network" is a neural network that learns how to predict (estimate) pixel-by-pixel depth in an image—the distance of each pixel from the camera or vantage point from which the image frame was created. As also discussed above, a "depth map" is an image in which the intensity of each pixel represents the distance of that pixel from the camera or vantage point from which the image was created.

At block 620, proxy-task estimation module 215 generates a point cloud 245 from the depth map 240 using a differentiable unprojection operation 420 based on a set of estimated camera intrinsic parameters 270 associated with a parametric camera model. These operations are discussed in greater detail above in connection with FIG. 4.

At block 630, proxy-task estimation module 215 processes, using a pose network 440, the current image frame 310*a* and a context image frame 310*b* captured by the camera to produce a camera pose estimate 250. As discussed above, a "pose network" is a neural network that learns how to predict (estimate) the ego motion (motion of the camera relative to the scene) or "camera pose" between two image frames. In this case, the two image frames of interest are the current image frame 310*a* in a sequence of images 238 and a context image frame 310*b* of the same scene captured by the same camera but from a different viewpoint (i.e., at a different point in time at which the camera was in a different position than that in which it captured the current image frame 310*a*). For example, the context image frame 310*b* could be a consecutive (adjacent) image frame in the sequence of images relative to the current image frame 310*a*, either immediately preceding or immediately following the current image frame 310*a*. In other embodiments, the current image frame 310*a* and the context image frame 310*b* are not necessarily consecutive image frames. They might be separated by a few image frames, for example.

At block 640, calibration module 220 warps the point cloud 245 based on the camera pose estimate 250 to produce a warped point cloud 255. This warping operation is discussed in greater detail above in connection with FIG. 4.

At block 650, calibration module 220 generates a warped image frame 260 from the warped point cloud 255 using a differentiable projection operation 430 based on the set of estimated camera intrinsic parameters 270. This warping operation is discussed in greater detail above in connection with FIG. 4.

At block 660, calibration module 220 compares the warped image frame 260 with the context image frame 310*b* to produce a self-supervised photometric loss 450. The self-supervised photometric loss 450 is mathematically defined above in connection with the discussion of FIG. 4.

At block 670, calibration module 220 updates the set of estimated camera intrinsic parameters 270 on a per-image-sequence basis using one or more gradients from the self-supervised photometric loss 450. As discussed above, this updating of the estimated camera intrinsic parameters 270 can be performed iteratively as a sequence of images 238 is processed by self-supervised camera self-calibration system 140 during a training phase or in a re-learning phase in response to a perturbation of the camera that changes the camera's characteristics. These concepts are discussed in greater detail above in connection with FIG. 4.

At block 680, image rectification module 225 generates, based on a learned set of camera intrinsic parameters to which the set of estimated camera intrinsic parameters 270 has converged in accordance with one or more predetermined convergence criteria, a rectified image frame 275 from an image frame 310 in the sequence of images 238 captured by the camera. As discussed above, the rectified image frame 275 corrects distortion in the original image frame 310. As also discussed above, some downstream computer-vision processes in a robot 100 do not work as well with distorted images. Learning the camera's intrinsic parameters 270 through the techniques described herein and producing rectified images 275 through knowledge of those intrinsic parameters 270 improves the performance of those downstream processes.

In some embodiments, method 600 includes additional actions that are not shown in FIG. 6. For example, in some embodiments, control module 230 controls operation of a robot 100 based, at least in part, on the rectified image frame 275. As discussed above, herein, to "control operation of a robot 100" means to control any aspect of the robot's operation. Examples include the robot's movement trajectory (if the robot is mobile), stopping/going, acceleration, deceleration, actions of various actuators 130, user interfaces, and other interactions of the robot 100 with its environment. A more specific example is an autonomous vehicle. Controlling such a robot includes controlling steering, acceleration, braking, turn signals, and other automated-driving features.

As discussed above, in some embodiments, method 600 includes calibration module 220 learning the "learned" (converged) set of camera intrinsic parameters in response to a perturbation of the camera that changes one or more characteristics of the camera. As also discussed above, in some embodiments, this re-learning of the camera intrinsic parameters on the fly can be performed automatically, if self-calibration system 140 detects that a perturbation of the camera has occurred.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims rather than to the foregoing specification, as indicating the scope hereof.

What is claimed is:

1. A system for self-supervised learning of camera intrinsic parameters from a sequence of images, the system comprising:
   a processor; and
   a memory storing computer-readable instructions that, when executed by the processor, cause the processor to:
   produce a depth map from a current image frame captured by a camera;
   generate a point cloud from the depth map using a differentiable unprojection operation based on estimated camera intrinsic parameters of a parametric camera model;
   process the current image frame and a context image frame captured by the camera to produce a camera pose estimate;
   produce a warped point cloud based on the camera pose estimate;
   generate a warped image frame from the warped point cloud using a differentiable projection operation based on the estimated camera intrinsic parameters;
   compare the warped image frame with the context image frame to produce a self-supervised photometric loss;
   update the estimated camera intrinsic parameters on a per-image-sequence basis using a gradient from the self-supervised photometric loss; and
   generate, based on learned camera intrinsic parameters to which the estimated camera intrinsic parameters have converged according to predetermined convergence criteria, a rectified image frame that corrects distortion in an image frame captured by the camera, wherein the convergence criteria include at least updating until a change in the estimated camera intrinsic parameters from iteration to iteration falls below a predetermined threshold.

2. The system of claim 1, wherein the computer-readable instructions include further instructions that, when executed by the processor, cause the processor to control operation of a robot based, at least in part, on the rectified image frame.

3. The system of claim 2, wherein the robot is one of a manually driven vehicle, an autonomous vehicle, an indoor robot, and an aerial drone.

4. The system of claim 1, wherein the parametric camera model is one of a pinhole camera model, a Unified Camera Model, an Extended Unified Camera Model, and a Double Sphere Camera Model.

5. The system of claim 1, wherein the computer-readable instructions include further instructions that, when executed by the processor, cause the processor to learn the learned camera intrinsic parameters in response to a perturbation of the camera that changes one or more characteristics of the camera.

6. The system of claim 1, wherein self-supervised depth learning and self-supervised pose learning serve as proxy tasks for learning the learned camera intrinsic parameters.

7. The system of claim 1, wherein a geometry of the camera is one of perspective, fisheye, and catadioptric.

8. A non-transitory computer-readable medium for self-supervised learning of camera intrinsic parameters from a sequence of images and storing instructions that, when executed by a processor, cause the processor to:
   produce a depth map from a current image frame captured by a camera;
   generate a point cloud from the depth map using a differentiable unprojection operation based on estimated camera intrinsic parameters of a parametric camera model;
   process the current image frame and a context image frame captured by the camera to produce a camera pose estimate;
   produce a warped point cloud based on the camera pose estimate;
   generate a warped image frame from the warped point cloud using a differentiable projection operation based on the estimated camera intrinsic parameters;
   compare the warped image frame with the context image frame to produce a self-supervised photometric loss;
   update the estimated camera intrinsic parameters on a per-image-sequence basis using a gradient from the self-supervised photometric loss; and
   generate, based on learned camera intrinsic parameters to which the estimated camera intrinsic parameters have converged according to predetermined convergence criteria, a rectified image frame that corrects distortion in an image frame captured by the camera, wherein the convergence criteria include at least updating until a change in the estimated camera intrinsic parameters from iteration to iteration falls below a predetermined threshold.

9. The non-transitory computer-readable medium of claim 8, wherein the instructions include further instructions that, when executed by the processor, cause the processor to control operation of a robot based, at least in part, on the rectified image frame.

10. The non-transitory computer-readable medium of claim 9, wherein the robot is one of a manually driven vehicle, an autonomous vehicle, an indoor robot, and an aerial drone.

11. The non-transitory computer-readable medium of claim 8, wherein the parametric camera model is one of a pinhole camera model, a Unified Camera Model, an Extended Unified Camera Model, and a Double Sphere Camera Model.

12. The non-transitory computer-readable medium of claim 8, wherein the instructions include further instructions that, when executed by the processor, cause the processor to learn the learned camera intrinsic parameters in response to a perturbation of the camera that changes one or more characteristics of the camera.

13. The non-transitory computer-readable medium of claim 8, wherein self-supervised depth learning and self-supervised pose learning serve as proxy tasks for learning the learned camera intrinsic parameters.

14. A method, comprising:
   producing a depth map from a current image frame captured by a camera;

generating a point cloud from the depth map using a differentiable unprojection operation based on estimated camera intrinsic parameters of a parametric camera model;

processing the current image frame and a context image frame captured by the camera to produce a camera pose estimate;

producing a warped point cloud based on the camera pose estimate;

generating a warped image frame from the warped point cloud using a differentiable projection operation based on the estimated camera intrinsic parameters;

comparing the warped image frame with the context image frame to produce a self-supervised photometric loss;

updating the estimated camera intrinsic parameters on a per-image-sequence basis using a gradient from the self-supervised photometric loss; and generating, based on learned camera intrinsic parameters to which the estimated camera intrinsic parameters have converged according to predetermined convergence criteria, a rectified image frame that corrects distortion in an image frame captured by the camera, wherein the convergence criteria include at least updating until a change in the estimated camera intrinsic parameters from iteration to iteration falls below a predetermined threshold.

15. The method of claim 14, further comprising controlling operation of a robot based, at least in part, on the rectified image frame.

16. The method of claim 15, wherein the robot is one of a manually driven vehicle, an autonomous vehicle, an indoor robot, and an aerial drone.

17. The method of claim 14, wherein the parametric camera model is one of a pinhole camera model, a Unified Camera Model, an Extended Unified Camera Model, and a Double Sphere Camera Model.

18. The method of claim 14, wherein the learned camera intrinsic parameters are learned in response to a perturbation of the camera that changes one or more characteristics of the camera.

19. The method of claim 14, wherein self-supervised depth learning and self-supervised pose learning serve as proxy tasks for learning the learned camera intrinsic parameters.

20. The method of claim 14, wherein a geometry of the camera is one of perspective, fisheye, and catadioptric.

* * * * *